(12) United States Patent
Saeki et al.

(10) Patent No.: US 6,372,986 B1
(45) Date of Patent: Apr. 16, 2002

(54) GROMMET WRONG ASSEMBLY PREVENTIVE STRUCTURE

(75) Inventors: Shinichi Saeki; Ikuo Takeda, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/644,747

(22) Filed: Aug. 24, 2000

(51) Int. Cl.$^7$ .................................................. H02G 3/18
(52) U.S. Cl. ............................... 174/65 G; 174/152 G; 16/2.1; 248/56
(58) Field of Search .......................... 174/65 G, 65 SS, 174/65 R, 152 G, 153 G, 151, 135, 153 R; 248/56; 16/2.1, 2.2; 439/604, 587, 274, 275; 285/158, 338, 343

(56) References Cited

U.S. PATENT DOCUMENTS

| | | | |
|---|---|---|---|
| 4,000,875 A | * | 1/1977 | Jemison et al. ............... 248/56 |
| 4,515,991 A | * | 5/1985 | Hutchison ............... 174/65 SS |
| 4,983,784 A | * | 1/1991 | Whitlock ............... 174/65 SS |
| 5,777,274 A | * | 7/1998 | Kawase .................. 174/153 G |
| 6,015,952 A | * | 1/2000 | Mori ........................ 174/72 R |

FOREIGN PATENT DOCUMENTS

| | | | | |
|---|---|---|---|---|
| EP | 0278544 | * | 8/1988 | ............... 174/65 G |
| WO | 092020077 | * | 11/1992 | ............. 174/65 SS |

* cited by examiner

Primary Examiner—Dean A. Reichard
Assistant Examiner—Dhiru R Patel
(74) Attorney, Agent, or Firm—Morgan, Lewis & Bockius LLP

(57) ABSTRACT

The fit portions 10 of the right and left grommets 6 are structured such that each of the fit portions 10 extends across a portion of the wire harness covering cylindrical body 7 of the grommet 6 in the peripheral direction of the wire harness covering cylindrical body 7, the two side portions of such extending-across fit portion with the wire harness covering cylindrical body 7 as the boundary thereof are formed asymmetric in shape, and, when the right and left grommets 6 are positioned in the same direction, the fit portion 10 of the right grommet 6*b* is set so as to be rotated 180° with respect to the fit portion 10 of the left grommet 6*a*; in each of the right and left grommets 6, there is formed a display portion 12 which can be used to indicate the position and direction of the grommet 6 when assembling the same or can distinguish the assembling sides of the right and left grommets 6 from each other when assembling the same. On the other hand, the fit holes 8 of the right and left body panels 1, into which the fit portions 10 of the right and left grommets 6 are to be fitted, are disposed such that, on the right and left sides of the vehicle body, they are formed so as to be rotated 180° with respect to each other in correspondence to the setting of the fit portions 10 of the right and left grommets 6.

1 Claim, 2 Drawing Sheets

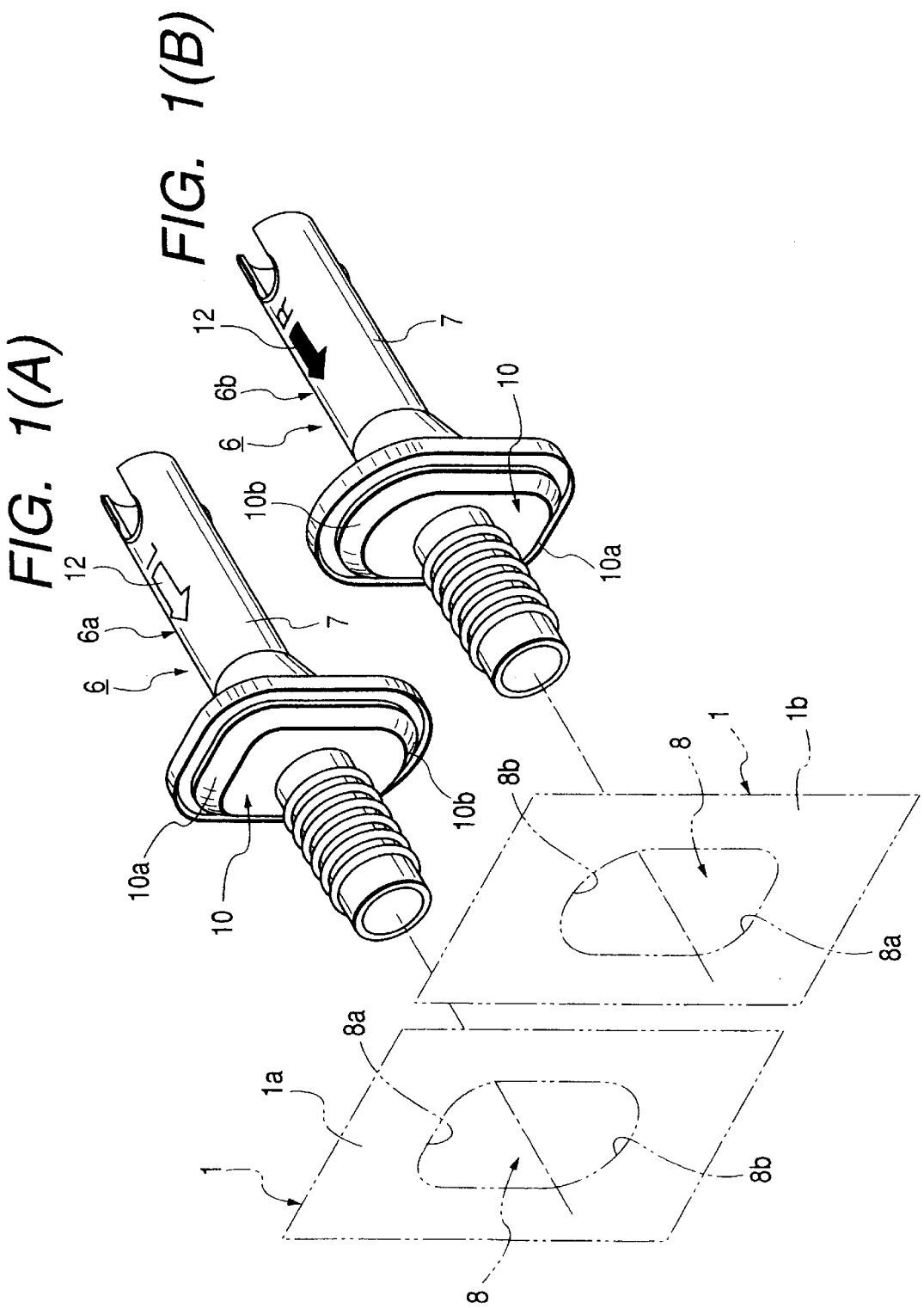

PRIOR ART
FIG. 2(A)
PRIOR ART
FIG. 2(B)
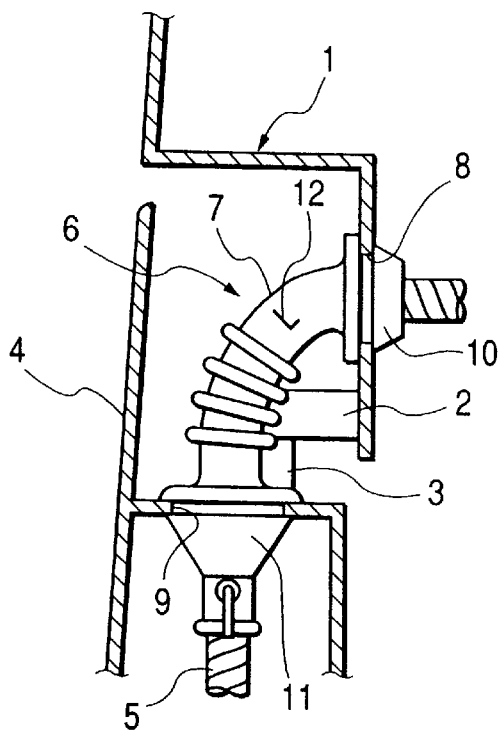
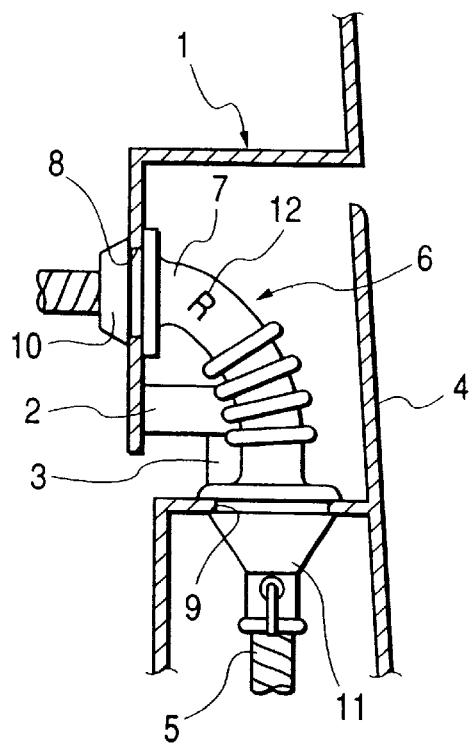
PRIOR ART
FIG. 3(A)
PRIOR ART
FIG. 3(B)
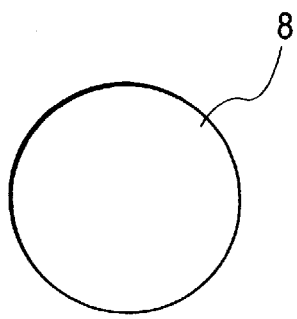
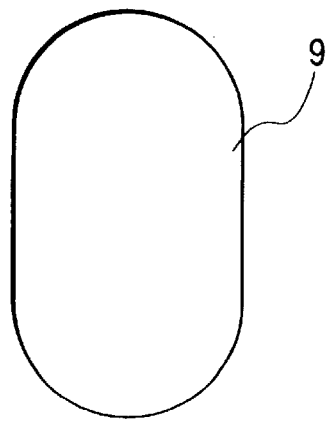

GROMMET WRONG ASSEMBLY PREVENTIVE STRUCTURE

BACKGROUND OF THE INVENTION

1. Field of the Invention

The present invention relates to a structure for preventing the wrong assembly of grommets of a right and left common use type which are used to cover two wire harnesses penetrating not only through two body panels of a vehicle such as a car but also through left and right opening/closing body panels respectively mounted openably and closably on the left and right sides of their associated body panels by hinge portions.

2. Related Art

In a vehicle such as a car, there are assembled to the vehicle two grommets which are respectively used to cover and protect their associated wire harnesses penetrating through their associated body panels and opening/closing body panels respectively mounted openably and closably on the left and right sides of their associated body panels by hinge portions. While the two grommets are respectively assembled to the right and left sides of the vehicle, in order to enhance the manufacturing efficiency of the grommets and to reduce the manufacturing cost thereof, the right and left grommets are structured so as to have the same shape, which makes it possible to use the grommets in common on the right and left sides of the vehicle. As a result of this, however, there is a fear that a right side grommet and a left side grommet can be assembled to the wrong sides of the vehicle. Thus, it is necessary to take measures to prevent the wrong assembly of these commonly usable grommets.

Conventionally, there is disclosed a structure shown in FIGS. 2 (A) and (B) to prevent the wrong assembly of the grommets of a right and left common usable type. According to this structure, the outer peripheries of wire harnesses 5, which are disposed so as to penetrate not only through two body panels 1 but also through two opening/closing body panels (door panels) 4 respectively mounted openably and closably on the right and left sides of their associated body panels 1 by hinge portions 2, 3, are covered by the wire harness covering cylindrical bodies 7 of right and left grommets 6 having the same shape; the two end portions of the wire harness covering cylindrical bodies 7 are inserted through fit holes 8, 9 formed in the respective body panels 1, 4; one-end sides of the wire harness covering cylindrical bodies 7, in fit portions 10 formed integrally on the outer peripheries of the wire harness covering cylindrical bodies 7, are respectively fitted into their corresponding fit holes 8 of the body panels 1; and, the-other-end sides of the wire harness covering cylindrical bodies 7, in fit portions 11 formed integrally on the outer peripheries of the wire harness covering cylindrical bodies 7, are respectively fitted into their corresponding fit holes 9 of the opening/closing body panels 4. In this grommet assembling structure, to prevent the wrong assembly of the right and left grommets, in the grommet 6 which is to be mounted on the left side of the vehicle, there is formed a display portion 12 which consists of a character such as "L" indicating the left-side mounting and, in the grommet 6 to be mounted on the right side, there is formed a display portion 12 consisting of a character such as "R" indicating the right-side mounting. Also, the fit portions 10, 11 of the right and left grommets 6 are formed in common in shape, that is, the fit portions 10, 11 are formed in a circular shape and in a substantially elliptical shape, respectively; and, the fit holes 8, 9 of the body panels 1, 4, into which these fit portions 10, 11 are to be fitted, are also respectively formed so as to correspond to the fit portions 10, 11 in shape, that is, as shown in FIGS. 3 (A) and (B), they are formed in a circular shape and in a substantially elliptical shape, respectively.

However, according to the conventional grommet wrong assembly preventive means, the display portions 12, which, in the case of the grommet 6 to be mounted on the left side, consists of a character such as "L" indicating the left-side mounting and also which, in the case of the grommet 6 to be mounted on the right side, consists of a character such as "R" indicating the right-side mounting, are respectively provided simply in the form of carved seals. Therefore, in case where the right and left grommets 6 are assembled while the display portions thereof are read in error, because the fit portions 10, 11 of the right and left grommets 6 are common in shaped, that is, they are respectively formed in a circular shape and in a substantially elliptical shape, there is a fear that the right and left grommets 6 can be assembled in the wrong state. This means that the above-mentioned conventional grommet wrong assembly preventive means, fundamentally, is not be able to prevent the wrong assembly of the grommets positively.

SUMMARY OF THE INVENTION

In view of the above, it is an object of the invention to provide a grommet wrong assembly preventive structure which can prevent more positively the wrong assembly of grommets of a right and left common use type.

In attaining the above object, according to the invention, there is provided, for use in a structure for assembling grommets of a right and left common use type, in which the outer peripheries of two wire harnesses respectively disposed so as to penetrate through their associated body panels and through their associated opening/closing panels openably and closably mounted on the right and left sides of the body panels are covered by the wire harness covering cylindrical bodies of right and left grommets respectively formed so as to have the same shape, the two end portions of the wire harness covering cylindrical bodies are inserted through fit holes respectively formed in the body panels, and at least one-end sides of the wire harness covering cylindrical bodies, in fit portions formed integrally on the outer peripheries of the wire harness covering cylindrical bodies of the right and left grommets, are fitted into the corresponding ones of the fit holes of the body panels, a grommet wrong assembly preventive structure, provided in that each of the fit portions of the right and left grommets extends across a portion of its associated wire harness covering cylindrical body in the peripheral direction thereof, and the two sides of the extending-across fit portion with the associated wire harness covering cylindrical body as the boundary thereof are formed asymmetric in shape; when the right and left grommets are positioned in the same direction, the fit portion of the right grommet is set so as to be rotated 180° with respect to the fit portion of the left grommet; in the right and left grommets, there are respectively formed display portions which can be used to specify the position and direction of the grommets or distinguish the assembling sides of the right and left grommets from each other when assembling the same; and, the fit holes of the right and left body panels into which the fit portions of the right and left grommets are to be fitted, on the right and left sides of a vehicle body, are disposed so as to be rotated 180° with respect to each other in correspondence to the above setting of the fit portions of the right and left grommets.

Thanks to this structure, even in case where the display portions are misread and thus the right and left grommets are going to be assembled in the wrong way, the fit portions of the grommets do not coincide in shape with the fit holes of the body panels into which the fit portions are to be fitted, thereby being able to prevent the wrong assembly of the grommets.

BRIEF DESCRIPTION OF DRAWINGS

FIGS. 1 (A) and (B) respectively show an embodiment of a grommet wrong assembly preventive structure according to the invention; specifically, FIG. 1 (A) is an explanatory perspective view of a wrong assembly preventive structure on the left side of a vehicle; and, FIG. 1 (B) is an explanatory perspective view of a wrong assembly preventive structure on the right side of the vehicle;

FIGS. 2 (A) and (B) respectively show a conventional grommet wrong assembly preventive structure; specifically, FIG. 2 (A) is a longitudinally sectional plan view of a wrong assembly preventive structure on the left side of a vehicle; and, FIG. 2 (B) is a longitudinally sectional plan view of a wrong assembly preventive structure on the right side of the vehicle; and, FIGS. 3 (A) and (B) are respectively explanatory views of the shapes of fit holes formed in the right and left body panels as well as in the right and left opening/closing body panels, which are used for fit of conventional grommets.

DETAILED DESCRIPTION OF PREFERRED EMBODIMENTS OF INVENTION

Now, FIGS. 1 (A) and (B) respectively show an embodiment of a grommet wrong assembly preventive structure according to the invention. Specifically, FIG. 1 (A) is an explanatory perspective view of a wrong assembly preventive structure on the left side of a vehicle, and FIG. 1 (B) is an explanatory perspective view of a wrong assembly preventive structure on the right side of the vehicle.

In the present embodiment, in two grommets 6 which are formed so as to have the same shape and can be used in common on the right and left side of the vehicle, only on one side in the longitudinal direction thereof, there are formed fit portions 10, whereas no fit portion is formed on the opposite side. Each of the fit portions 10 of the right and left grommets 6 extends across a portion of its associated wire harness covering cylindrical body 7 in the peripheral direction thereof, and the two sides of the extending-across fit portion with the associated wire harness covering cylindrical body 7 as the boundary thereof are formed asymmetric in shape.

In the present embodiment, the two sides of the fit portion 10 extending across a portion of its associated wire harness covering cylindrical body 7 upwardly and downwardly in the peripheral direction thereof with the wire harness covering cylindrical body 7 as the boundary thereof are formed asymmetric in shape: that is, one side is formed as a substantially flat-shaped portion 10a, whereas the other side is formed as a slightly sharpened arc-shaped portion 10b on the other side, namely, the upper and lower sides of the fit portion 10 are formed asymmetric in shape.

And, when the right and left grommets 6 are positioned on the same direction, the fit portion 10 of the right grommet 6b is set in such a manner that it is rotated 180° with respect to the fit portion 10 of the left grommet 6a. That is, in the left grommet 6a, the two sides of the fit portion 10, which extends across a portion of its associated wire harness covering cylindrical body 7 upwardly and downwardly in the peripheral direction thereof with the wire harness covering cylindrical body 7 as the boundary thereof, are formed asymmetric in shape; that is, the upper side of the fit portion 10 is formed as a substantially flat-shaped portion 10a and the lower side thereof is formed as a downwardly slightly sharpened arc-shaped portion 10b, namely, the two side portions of the fit portion 10 are formed asymmetric in shape in the vertical direction. Also, in the right grommet 6b, the two sides of the fit portion 10, which extends across a portion of its associated wire harness covering cylindrical body 7 upwardly and downwardly in the peripheral direction thereof with the wire harness covering cylindrical body 7 as the boundary thereof, are formed asymmetric in shape; that is, the upper side of the fit portion 10 is formed as an upwardly slightly sharpened arc-shaped portion 10b and the lower side thereof is formed as a substantially flat-shaped portion 10a, namely, the two side portions of the fit portion 10 are also formed asymmetric in shape in the vertical direction. The fit portions 10 of these right and left grommets are formed symmetric and parallel to each other in the respective right and left portions thereof.

Also, in the left grommet 6a, there is formed a display portion 12 for displaying not only a position which corresponds to the shape of the substantially flat-shaped portion, one of the two asymmetric portions of the fit portion 10, and provides the upper side in the grommet assembled state, but also a character "L" which indicates the left side in the grommet assembled state. And, in the right grommet 6b, there is formed a display portion 12 for displaying not only a position which corresponds to the shape of the slightly sharpened arc-shaped portion, the other of the two asymmetric portions of the fit portion 10, and provides the upper side in the grommet assembled state, but also a character "R" which indicates the right side in the grommet assembled state. on the other hand, the fit holes 8 of the right and left body panels 1, into which the fit portions 10 of the right and left grommets 6 are fitted, are disposed in such a manner that, on the right and left sides of the vehicle body, they are rotated 180° with respect to each other correspondingly to the fit portions 10 the right and left grommets 6. That is, the fit hole 8 of the left body panel 1a is structured such that the upper portion thereof is formed as a substantially flat-shaped portion 8a, the lower portion thereof is formed as a downwardly slightly sharpened arc-shaped portion 8b, the right and left portions thereof are formed parallel to each other, and the fit hole 8 is formed asymmetric in shape in the vertical direction thereof. And, the fit hole 8 of the right body panel 1b is structured such that the upper portion thereof is formed as an upwardly slightly sharpened arc-shaped portion 8b, the lower portion thereof is formed as a substantially flat-shaped portion 8a, the right and left portions thereof are formed parallel to each other, and the fit hole 8 is formed asymmetric in shape in the vertical direction thereof.

According to the present structure, even in case where the display portions 12 are misread and thus the right and left grommets 6 are going to be assembled in the wrong way, the fit portions 10 of the grommets 6 do not coincide in shape with the fit holes 8 of the body panels 1, thereby being able to prevent the grommets from being assembled in the wrong manner.

By the way, the asymmetric shape of the fit portion 10 is not limited to the vertical direction thereof, but the shapes of the two side portions of the fit portion 10 extending across a position of the wire harness covering cylindrical body 7 in the peripheral direction thereof may be formed asymmetric.

And, in this case, the fit holes 8 of the body panels 1 may be formed so as to correspond to the asymmetric shapes of the two side portions of the fit portion.

As has been described heretofore, in the grommet wrong assembly preventive structure according to the invention, the fit portions of the right and left grommets are structured such that each of the fit portions extends across a portion of the wire harness covering cylindrical body of the grommet in the peripheral direction of the wire harness covering cylindrical body, the two side portions of such extending-across fit portion with the wire harness covering cylindrical body as the boundary thereof are formed asymmetric in shape, and, when the right and left grommets are positioned in the same direction, the fit portion of the right grommet is set so as to be rotated 180° with respect to the fit portion of the left grommet; in each of the right and left grommets, there is formed a display portion which can be used to indicate the position and direction of the grommet when assembling the same or can distinguish the assembling sides of the right and left grommets from each other when assembling the same; and, the fit holes of the right and left body panels, into which the fit portions of the right and left grommets are to be fitted, are disposed such that, on the right and left sides of the vehicle body, they are formed so as to be rotated 180° with respect to each other in correspondence to the setting of the fit portions of the right and left grommets. Thanks to this structure, even in case where the display portions are misread and thus the right and left grommets are going to be assembled in the wrong way, the fit portions of the grommets do not coincide in shape-with the fit holes of the body panels into which the fit portions are to be fitted, thereby being able to prevent the grommets from being assembled in a wrong manner.

What is claimed is:

1. For use in a structure for assembling grommets of a right and left common use type comprising:

a plurality of wire harnesses, the outer peripheries of two wire harnesses of said plurality of wire harnesses respectively disposed so as to penetrate through at least one of their associated body panel and through their associated opening/closing panel openably and closably mounted on the right and left sides of said body panels by hinge portions, said two wire harnesses covered by wire harness covering cylindrical bodies of right and left grommets respectively formed so as to have the same shape, said right and left grommets having two end portions of said wire harness covering cylindrical bodies which are inserted through fit holes respectively formed in said body panels, wherein at least one-end sides of said wire harness covering cylindrical bodies of said right and left grommets, in fit portions respectively formed in the outer peripheries of said wire harness covering cylindrical bodies of said right and left grommets so as to be integral therewith, are fitted into their corresponding ones of said fit holes formed in said body panels;

a grommet wrong assembly preventive structure, each of said fit portions of said right and left grommets extending across a portion of its associated wire harness covering cylindrical body in the peripheral direction thereof, and two sides of said extending-across fit portion with said associated wire harness covering cylindrical body as the boundary thereof are formed asymmetric in shape;

when said right and left grommets are positioned in the same direction, said fit portion of said right grommet is set so as to be rotated 180° with respect to said fit portion of said left grommet;

in said right and left grommets, there are respectively formed display portions which can be used to specify the position and direction of said right and left grommets or distinguish the assembling sides of said right and left grommets from each other when assembling the same; and, said fit holes of said right and left body panels into which said fit portions of said right and left grommets are to be fitted, on the right and left sides of a vehicle body, are disposed so as to be rotated 180° with respect to each other in correspondence to said setting of said fit portions of said right and left grommets.

* * * * *